(12) United States Patent
Cremiere

(10) Patent No.: US 8,907,536 B2
(45) Date of Patent: Dec. 9, 2014

(54) DEVICE FOR ACTUATING AN ITEM OF EQUIPMENT THAT CAN BE CONTROLLED AUTOMATICALLY OR MANUALLY, WITH DETECTION OF TAKE-UP OF MANUAL CONTROL

(75) Inventor: Benoit Cremiere, Paris (FR)

(73) Assignee: Sagem Defense Securite, Paris (FR)

( * ) Notice: Subject to any disclaimer, the term of this patent is extended or adjusted under 35 U.S.C. 154(b) by 5 days.

(21) Appl. No.: 13/980,864

(22) PCT Filed: Jan. 24, 2012

(86) PCT No.: PCT/EP2012/051051
§ 371 (c)(1),
(2), (4) Date: Jul. 19, 2013

(87) PCT Pub. No.: WO2012/101122
PCT Pub. Date: Aug. 2, 2012

(65) Prior Publication Data
US 2013/0300263 A1    Nov. 14, 2013

(30) Foreign Application Priority Data

Jan. 24, 2011   (FR) ..................... 11 50527

(51) Int. Cl.
*H02K 11/00* (2006.01)
*B64C 13/10* (2006.01)
*B64C 13/22* (2006.01)
*B64C 27/56* (2006.01)

(52) U.S. Cl.
CPC ............ *H02K 11/0063* (2013.01); *B64C 13/10* (2013.01); *B64C 13/22* (2013.01); *B64C 27/56* (2013.01)
USPC ........................... 310/68 B; 310/98; 244/196

(58) Field of Classification Search
USPC ........ 310/68 B, 75 R, 98–100; 244/196–197; 318/651–652, 721
See application file for complete search history.

(56) References Cited

U.S. PATENT DOCUMENTS

| | | | | |
|---|---|---|---|---|
| 3,603,167 A | * | 9/1971 | Arce | 74/388 R |
| 3,929,019 A | * | 12/1975 | Younkin | 73/724 |
| 3,940,990 A | * | 3/1976 | Younkin | 73/387 |
| 5,204,605 A | * | 4/1993 | Delattre et al. | 318/721 |
| 5,235,927 A | * | 8/1993 | Singh et al. | 114/144 E |
| 5,357,889 A | * | 10/1994 | Wood | 114/144 E |

(Continued)

FOREIGN PATENT DOCUMENTS

| | | |
|---|---|---|
| EP | 1 104 740 A1 | 6/2001 |
| EP | 2 033 892 A1 | 3/2009 |

*Primary Examiner* — Thanh Lam
(74) *Attorney, Agent, or Firm* — Muncy, Geissler, Olds & Lowe, P.C.

(57) ABSTRACT

An actuator device for actuating equipment has an electric motor arranged to be connected to an autopilot device and connected by a drivetrain to an outlet shaft, itself designed to be connected to a control instrument, the drivetrain incorporating stepdown gearing dividing the drivetrain into a high-speed segment beside the motor and a low-speed segment beside the outlet shaft. The high-speed segment comprising a deactivator member for deactivating the autopilot device. The deactivator member having a first element secured to a first portion of the high-speed segment; a second element secured to a second portion of the high-speed segment and connected to the first element to allow the first element to be angularly offset relative to the second element when a torque for transmission reaches a predetermined threshold; and a detector member for detecting the angular offset.

5 Claims, 1 Drawing Sheet

(56) References Cited

U.S. PATENT DOCUMENTS

| | | | |
|---|---|---|---|
| 5,769,362 A * | 6/1998 | Greene et al. | 244/197 |
| 6,491,148 B2 * | 12/2002 | Rodrigues | 192/48.5 |
| 7,969,110 B2 * | 6/2011 | Vincent et al. | 318/460 |
| 8,342,455 B2 * | 1/2013 | Allieta et al. | 244/194 |
| 2010/0210391 A1 * | 8/2010 | Dinger | 475/149 |
| 2011/0046824 A1 * | 2/2011 | Antraygue | 701/4 |

* cited by examiner

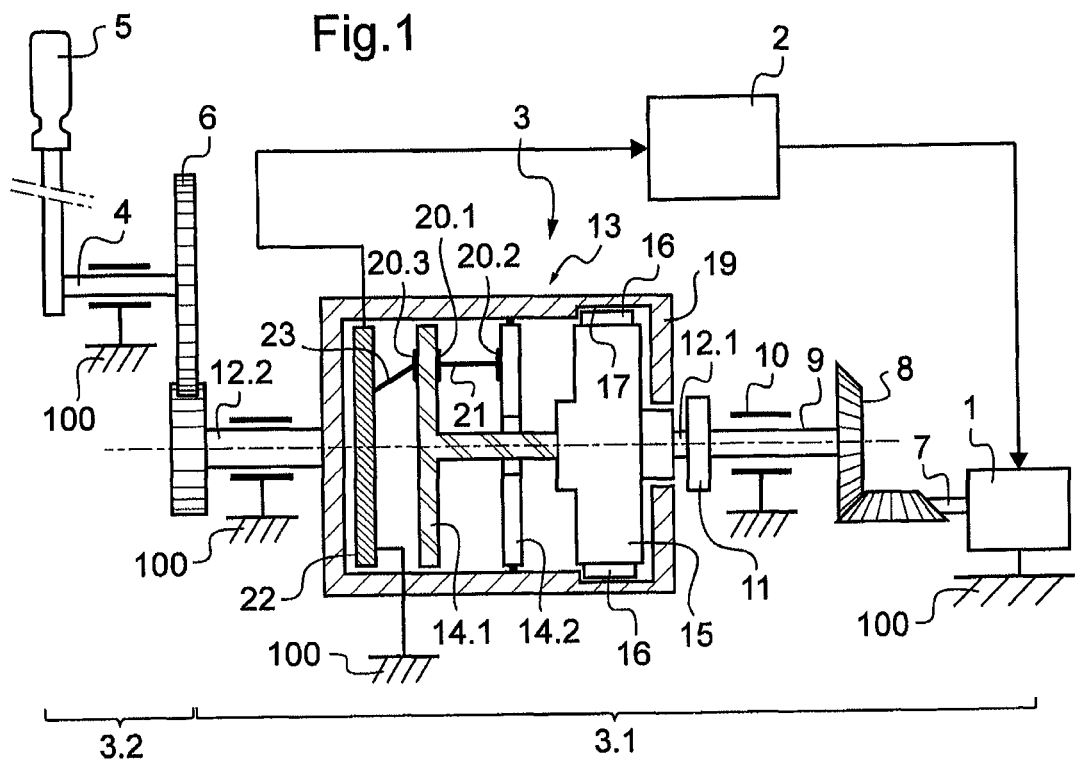
Fig.1
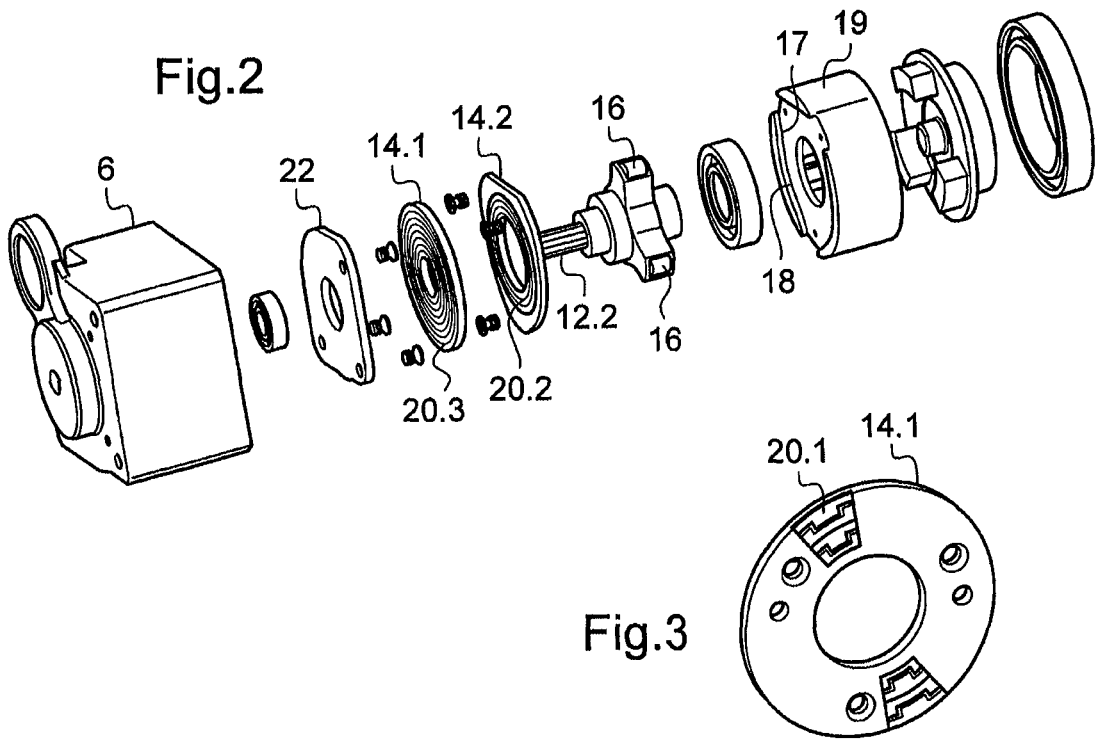
Fig.2
Fig.3

DEVICE FOR ACTUATING AN ITEM OF EQUIPMENT THAT CAN BE CONTROLLED AUTOMATICALLY OR MANUALLY, WITH DETECTION OF TAKE-UP OF MANUAL CONTROL

The present invention relates to an actuator device, in particular for actuating a piece of flight control equipment. By way of example, the actuator may form part of an aircraft such as a helicopter and may comprise a plurality of moving parts such as an electric motor. By way of example, the actuator may be a trim actuator.

Such an actuator generally comprises an electric motor that is arranged to be connected to an autopilot device and that is connected via a drivetrain to the outlet shaft of the actuator that is itself for connection to a command instrument such as a lever and/or to a flight control of the aircraft. The drivetrain includes stepdown gearing dividing the drivetrain into a high-speed segment beside the motor and a low-speed segment beside the outlet shaft of the actuator.

The high-speed segment includes a magnetic friction device to which the motor is connected via a system comprising a wormscrew and a gearwheel, and an intermediate coupling device of the clutch or freewheel type.

The low-speed segment includes a deactivator member for deactivating the autopilot device, the deactivator device comprising:
- a first plate secured to one of the elements of the gearing;
- a second plate connected to the clutch device;
- a torsion spring connecting the plates together so as to allow the first plate to be angularly offset relative to the second plate when the torque for transmission reaches a predetermined threshold; and
- switches connected to the autopilot device and co-operating with the angularly offset plates to enable said angular offset to be detected.

In autopilot mode, the electric motor is the element that drives the drivetrain, whereas with manual piloting the control instrument is the element that drives the drivetrain. On passing from autopilot mode to manual mode, it is important for take-up of piloting by the pilot to be detected as soon as possible so as to avoid the autopilot device opposing the pilot. The autopilot deactivator member must therefore inform the autopilot device that the pilot has taken up piloting as soon as the pilot produces a force opposing the force exerted by the autopilot device, i.e. as soon as an angular offset appears between the plates. At present, the deactivator member must also serve to transmit high levels of torque, which makes it difficult and expensive to obtain such accuracy.

An object of the invention is to provide means remedying the above-mentioned drawbacks.

To this end, the invention provides an actuator device for actuating equipment, the device comprising an electric motor that is arranged to be connected to an autopilot device and that is connected by a drivetrain to an outlet shaft of the actuator device, itself designed to be connected to a control instrument and/or to the equipment, the drivetrain incorporating stepdown gearing dividing the drivetrain into a high-speed segment beside the motor and a low-speed segment beside the outlet shaft of the actuator device. The high-speed segment includes a deactivator member for deactivating the autopilot device. The deactivator member comprises:
- a first element secured to a first portion of the high-speed segment;
- a second element secured to a second portion of the high-speed segment and connected to the first element in order to allow the first element to be angularly offset relative to the second element when a torque for transmission reaches a predetermined threshold; and
- a detector member for detecting the angular offset and connected to the autopilot device.

The first element and the second element are plates facing each other and connected to each other by a partially declutchable rotary link element. The first plate is provided with first conductive tracks to which first ends of blades are attached, the blades having second ends rubbing against respective conductive tracks extending over a face of the second plate facing the first plate. The detector member includes a stationary collector having rubbing against second conductive tracks of the first plate.

Thus, the deactivator member is in the segment of the drivetrain in which torque is smallest and in which the amplitude of rotation is greatest for a given movement of the control instrument. It is thus easier to detect an angular offset accurately.

Detecting the angular offset is also performed in a manner that is simpler by an electrical contact being set up between the relatively moving elements of the deactivator member. This structure for the detector member also makes it possible to overcome in particularly simple manner the main constraint acting on electrically powering said elements that results from them being mounted in the high-speed segment, namely the amplitude of the rotations of the elements of that segment.

Other characteristics and advantages of the invention appear on reading the following description of particular, non-limiting embodiments of the invention.

Reference is made to the accompanying drawings, in which:

FIG. 1 is a diagrammatic elevation view of the actuator device in accordance with the invention;

FIG. 2 is an exploded perspective view of the deactivator member; and

FIG. 3 is a fragmentary diagrammatic detail view of the deactivator member.

The invention described herein and shown in the above figures is an actuator device of an aircraft, and more particularly it is a trim actuator device.

The actuator device of the invention is thus designed to be fitted on board the aircraft and connected to the equipment it controls, e.g. comprising moving surfaces of the aircraft. The invention does not relate to the connection between the actuator device and said moving surfaces, which connection is made in conventional manner and is thus not described in detail herein.

The actuator device of the invention comprises a structure 100 to which an electric motor 1 is fastened, the electric motor being connected to an autopilot device 2 and being connected by a drivetrain given overall reference 3 to an outlet shaft 4 that is itself connected to a control instrument 5.

The drivetrain 3 includes stepdown gearing 6 dividing the drivetrain 3 into a high-speed segment 3.1 beside the motor 1 and a low-speed segment 3.2 beside the outlet shaft 4 from the actuator device.

The high-speed segment 3.1 has a wormscrew 7 that is secured to the outlet shaft of the motor 1 and that meshes with a gearwheel 8 mounted on a first intermediate shaft 9. The first intermediate shaft 9 passes through a friction member 10 to reach one end of a coupling member 11 having an opposite end connected to a second intermediate shaft 12 connected to the high-speed stage of the gearing 6 which has its low-speed stage connected to the outlet shaft 4 of the actuator device, thus together forming the low-speed segment 3.2. The shafts constituting the drivetrain 3 are mounted on the structure 100 in conventional manner via bearings that serve to guide them in rotation. The assembly comprising the gearwheel 8 and the wormscrew 7 provides non-reversible transmission of motion from the motor 1 to the intermediate shaft 9. The friction member 10 is itself known and serves to resist rotation of the intermediate shaft 9 and thus of the entire drivetrain 3 and of the control instrument 5. This makes it possible to improve the pilot's feel when operating the control instrument 5 and holding it in position, in the absence of any force being exerted by the pilot or by the motor 1 on the drivetrain 3. The coupling member 11 is also itself known, e.g. being of the clutch type or of the freewheel type, and it serves to limit any influence that a continuous side wind can have on the drivetrain 3.

The high-speed segment 3.1 also has a deactivator member 13 for deactivating the autopilot device 2. The intermediate shaft in this example has two portions 12.1 and 12.1 with the deactivator member 13 mounted between them and comprising:

a first plate 14.1 secured to the first portion 12.1; and
a second plate 14.2 secured to the second portion 12.2 and connected to the first plate 14.1 in order to allow the first plate 14.1 to be angularly offset relative to the second plate 14.2 when the torque or transmission reaches a predetermined threshold. Such a torque appears when the autopilot 2 is active and is causing the drivetrain 3 to move via the motor 1, and when the pilot is acting on the control instrument 5 to oppose the movement in question.

The transmission of torque up to the predetermined threshold is provided by a system of presser rollers. The system comprises a wheel 15 having peripheral presser rollers 16 secured to the plate 14.1 with the rollers 16 bearing radially against a cylindrical surface 17 forming part of a support 19 secured to the plate 14.2. The cylindrical surface 17 has housings 18 for receiving fractions of the rollers 16. The rollers 16 remain in the housings 18, thereby constraining the plates to rotate together so long as the transmitted source is below the predetermined threshold. When the torque to be transmitted is greater than the predetermined threshold, the turning of the wheel 15 and the resistance to rotation of the support of the cylindrical surface 17 (or vice versa) forces the rollers 16 to leave the housings 1.8 and thus allows the plates 14.1 and 14.2 to become angularly offset.

The deactivator member 13 has a member for detecting angular offset, which member is connected to the autopilot device 2 and operates by establishing electrical contacts between conductive tracks carried by the plates 14.1 and 14.2.

Thus, the plate 14.1 possesses firstly, facing the plate 14.2, a surface over which there extend conductive tracks 20.1, and secondly on its opposite side, a second set of conductive tracks 20.3. The conductive tracks 20.1 and 20.3 are electrically connected together in pairs.

Facing the tracks 20.1 of the plate 14.1, the plate 14.2 possesses a surface over which there extend conductive tracks 20.2.

The plate 14.1 is also provided with blades 21, each having a free end rubbing against the conductive tracks 20.2 of the plate 14.2 and an opposite end connected to a respective one of the conductive tracks 20.1 on the plate 14.1.

The detector member has a stationary collector 22 that is secured to the structure 100 and that includes brushes 23 rubbing against the conductive tracks 20.3 of the first plate 14.1.

The brushes 23 are connected to the autopilot 2 and they are subjected to a potential difference. The conductive tracks 20.1 and 20.2 are arranged so that the when the plates become angularly offset relative to each other, the blades 21 make electrical contacts between the conductive tracks 20.1 and 20.2 thus allowing current to pass between the brushes 23. The autopilot 2 is thus informed that the pilot is opposing the movement that the autopilot 2 is attempting to apply and it deactivates itself until the pilot activates it once more.

Naturally, the invention is not limited to the embodiment described but covers any variant coming within the field of the invention as defined by the claims.

In particular, the deactivator member may have a structure that is different from that described and may for example have a torsion bar or the like instead of a system with presser rollers.

The actuator device may also have a structure that is different from that described, in particular concerning the positioning or the presence of the various elements making up the drivetrain.

The friction member may be a member comprising a strip.

The invention claimed is:

1. An actuator device for actuating equipment, the device comprising an electric motor that is arranged to be connected to an autopilot device and that is connected by a drivetrain to an outlet shaft, itself designed to be connected to a control instrument, the drivetrain incorporating stepdown gearing dividing the drivetrain into a high-speed segment beside the motor and a low-speed segment beside the outlet shaft, the device being characterized in that the high-speed segment includes a deactivator member for deactivating the autopilot device, the deactivator member comprising:

a first element secured to a first portion of the high-speed segment;

a second element secured to a second portion of the high-speed segment and connected to the first element in order to allow the first element to be angularly offset relative to the second element when a torque for transmission reaches a predetermined threshold; and a detector member for detecting the angular offset and connected to the autopilot device, the first element and the second element being mutually facing plates that are connected to each other by a partially declutchable rotary link element, namely a first plate provided on one side with conductive tracks and on its other side with a second set of conductive tracks, and a second plate fitted on its face facing the first plate with a set of conductive tracks, the tracks of the first plate being connected to first ends of conductive blades having opposite ends rubbing against the tracks of the second plate, the detector member including a stationary collector secured to the structure and including brushes rubbing against the conductive tracks of the first plate.

2. The device according to claim 1, wherein the partially declutchable rotary link element is a system of presser rollers.

3. The device according to claim 1, wherein the high-speed segment includes a friction member and an intermediate coupling member.

4. The device according to claim 3, wherein the friction member is a strip member.

5. The device according to claim 3, wherein the coupling member is a clutch member or a freewheel.

* * * * *